(12) United States Patent
Kim

(10) Patent No.: US 10,744,907 B2
(45) Date of Patent: Aug. 18, 2020

(54) SEAT RAIL FOR VEHICLE

(71) Applicant: HYUNDAI DYMOS INCORPORATED, Seosan-si, Chungcheongnam-do (KR)

(72) Inventor: Cheon Kim, Hwaseong-si (KR)

(73) Assignee: HYUNDAI DYMOS INCORPORATED, Seosan-si (KR)

( * ) Notice: Subject to any disclaimer, the term of this patent is extended or adjusted under 35 U.S.C. 154(b) by 42 days.

(21) Appl. No.: 16/208,688

(22) Filed: Dec. 4, 2018

(65) Prior Publication Data

US 2019/0193594 A1 Jun. 27, 2019

(30) Foreign Application Priority Data

Dec. 26, 2017 (KR) .................. 10-2017-0180233

(51) Int. Cl.
*B60N 2/07* (2006.01)
*B60N 2/08* (2006.01)

(52) U.S. Cl.
CPC ......... *B60N 2/0727* (2013.01); *B60N 2/0806* (2013.01); *B60N 2/0843* (2013.01); *B60N 2/0875* (2013.01); *B60N 2/0881* (2013.01)

(58) Field of Classification Search
CPC ...... B60N 2/0727; B60N 2/08; B60N 2/0806; B60N 2/0843; B60N 2/0881
USPC .................................................... 296/65.136
See application file for complete search history.

(56) References Cited

U.S. PATENT DOCUMENTS

| 7,963,496 | B2* | 6/2011 | Kojima | B60N 2/0818 248/429 |
| 2006/0071140 | A1* | 4/2006 | Kim | B60N 2/0705 248/430 |
| 2009/0314916 | A1* | 12/2009 | Kojima | B60N 2/0881 248/429 |
| 2016/0185260 | A1* | 6/2016 | Kim | B60N 2/0875 248/429 |

FOREIGN PATENT DOCUMENTS

| JP | 2008074380 | 4/2008 |
| KR | 2019980055188 | 10/1998 |
| KR | 1020080029111 | 4/2008 |

OTHER PUBLICATIONS

English translation of JP 2008-74380; retreived via PatentTranslate located at www.epo.org on Mar. 10, 2020. (Year: 2020).*

* cited by examiner

*Primary Examiner* — Jason S Daniels
(74) *Attorney, Agent, or Firm* — Burris Law, PLLC

(57) ABSTRACT

A seat rail for a vehicle includes a stopper part of a locking mounting bracket and a towel bar for inhibiting a misoperation of a release lever due to the feet of a rear seat passenger by inhibiting interference of the feet of the passenger with the release lever and inhibiting deformation of the towel bar when the towel bar is pressed down.

5 Claims, 4 Drawing Sheets

SEAT RAIL FOR VEHICLE

CROSS-REFERENCE TO RELATED APPLICATIONS

This application claims priority to and the benefit of Korean Patent Application No. 10-2017-0180233, filed on Dec. 26, 2017. The disclosure of the above application is incorporated herein by reference.

FIELD

The present disclosure relates to a seat rail for a vehicle having a towel bar, and more particularly, to a seat rail having a structure that inhibits interference of the feet of a rear seat passenger and deformation of the towel bar.

BACKGROUND

The statements in this section merely provide background information related to the present disclosure and may not constitute prior art.

A seat for a vehicle is configured to slide in forward/rearward directions of the vehicle by using a seat rail. The seat rail for a vehicle includes a fixed rail extending in the forward/rearward directions and being fixed to a floor panel in the vehicle, a moving rail combined with the fixed rail so as to slide along a longitudinal direction of the fixed rail, and a locking apparatus restricting sliding of the moving rail in the forward/rearward directions.

A method of operating the locking apparatus includes an electric-powered type using power of a motor and a manual type using a towel bar.

The towel bar has various names such as a slide lever, a seat rail lever, and a seat track lever.

Normally, the towel bar is provided on a first-row seat (a driver seat and a front passenger seat), and when a first-row seat passenger lifts up the towel bar, the seat rail is unlocked by operation of the locking apparatus and can slide in forward/rearward directions of the moving rail, and when the towel bar is lowered and restored to an initial position thereof as the towel bar lifted up by the passenger is released, the seat rail is locked by operation of the locking apparatus such that the moving rail cannot move.

Meanwhile, in the structure of the seat rail having the towel bar, when a rear seat passenger (a second-row seat passenger) stretches his or her feet to a space under the first-row seat, the locking apparatus may be brought into misoperation due to the feet of the rear seat passenger. Accordingly, the seat rail having the towel bar has an additional structure so as to prevent the misoperation of the locking apparatus due to the feet of a rear seat passenger.

In addition, the seat rail having the towel bar has an additional structure such that, even when a passenger unconsciously presses down the towel bar, the towel bar is not bent, thereby preventing a misoperation of the locking apparatus.

However, the conventional seat rail has separate structures to prevent the misoperation of the locking apparatus due to the feet of a rear seat passenger and to prevent deformation of the towel bar, thereby increasing manufacturing cost and weight due to an increased number of parts.

SUMMARY

The present disclosure provides a seat rail for a vehicle having a towel bar, wherein by using one commonly-used part, the seat rail inhibits misoperation of a release lever due to the feet of a rear seat passenger by inhibiting interference of his or her feet with the release lever and further inhibits deformation of the towel bar when the towel bar is pressed down, thereby decreasing manufacturing cost and weight due to a reduction in the number of parts.

According to one aspect of the present disclosure, there is provided a seat rail for a vehicle, the seat rail including: a locking mounting bracket being combined on a moving rail so as to be fixed thereto and having a release lever rotatably combined therewith, the release lever constituting a locking apparatus; a lever mounting bracket being spaced apart from the locking mounting bracket in a forward direction of the vehicle and being combined on the moving rail so as to be fixed thereto; and a towel bar lever being rotatably combined with the lever mounting bracket, the towel bar lever having a towel bar combined with a first end thereof, and a second end thereof contacting with the release lever and being supported by the locking mounting bracket.

Inhibiting misoperation of the release lever due to interference of the feet of a rear seat passenger and a rotation of the towel bar in a downward direction of the vehicle may be realized by the locking mounting bracket.

The locking mounting bracket may include bracket flanges provided thereon, which are combined with the release lever, and a stopper part positioned behind the bracket flanges, each of the bracket flanges and the stopper part protruding in a side direction of the moving rail, wherein a rear end portion of the towel bar lever may contact an upper surface of a manipulation part of the release lever and be supported by a lower surface of the stopper part.

The stopper part of the locking mounting bracket may inhibit feet of a rear seat passenger from interfering with the release lever and a rotation of the towel bar in a downward direction via contact with the towel bar lever.

The stopper part may include a pad member combined therebeneath so as to inhibit noise, and the rear end portion of the towel bar lever may contact the pad member so as to be supported thereby.

A protruding length of the stopper part protruding in the side direction of the moving rail may be configured to be longer than a protruding length of the manipulation part of the release lever such that interference of the feet of a rear seat passenger can be stopped by the stopper part.

According to the present disclosure, by using the stopper part, which is one commonly-used part, of the locking mounting bracket, the seat rail for a vehicle having the towel bar inhibits the misoperation of the release lever due to the feet of a rear seat passenger by inhibiting interference of his or her feet with the release lever and inhibits deformation of the towel bar when the towel bar is pressed down, thereby decreasing the number of parts, manufacturing cost, and weight, and further making an entire external size of the seat rail compact.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
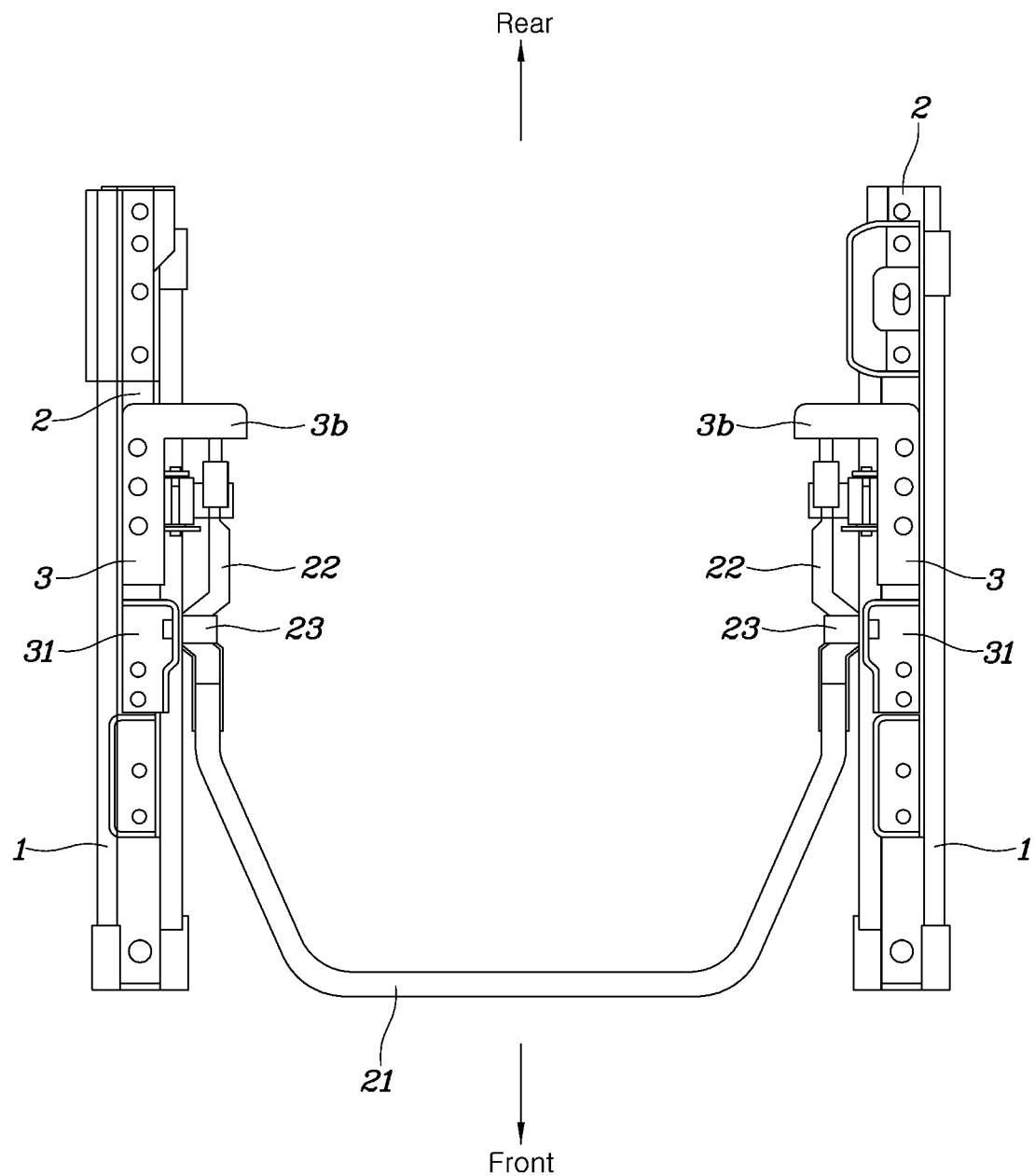
FIG. 1 is a top plan view of a seat rail according to the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinbelow, a seat rail for a vehicle according to an exemplary form of the present disclosure will be described in detail with reference to the accompanying drawings.

Figure 2:
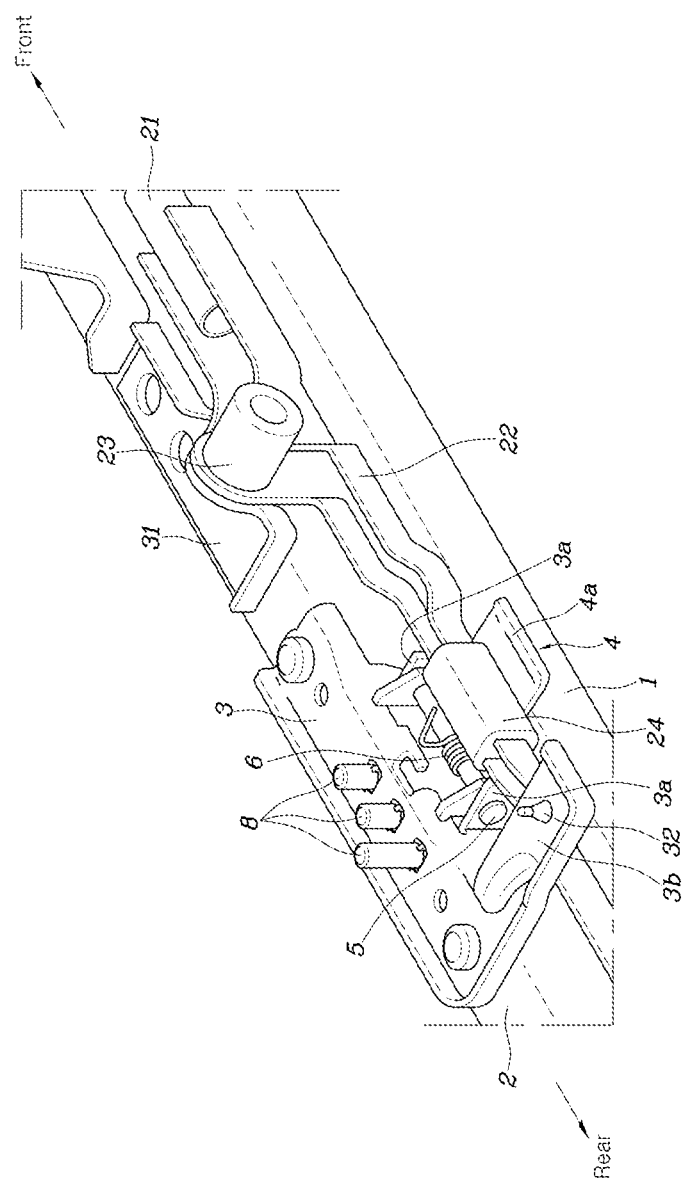
FIG. 2 is an enlarged perspective view of a portion of the seat rail of FIG. 1 at which a release lever and a towel bar lever are combined.
Figure 3:
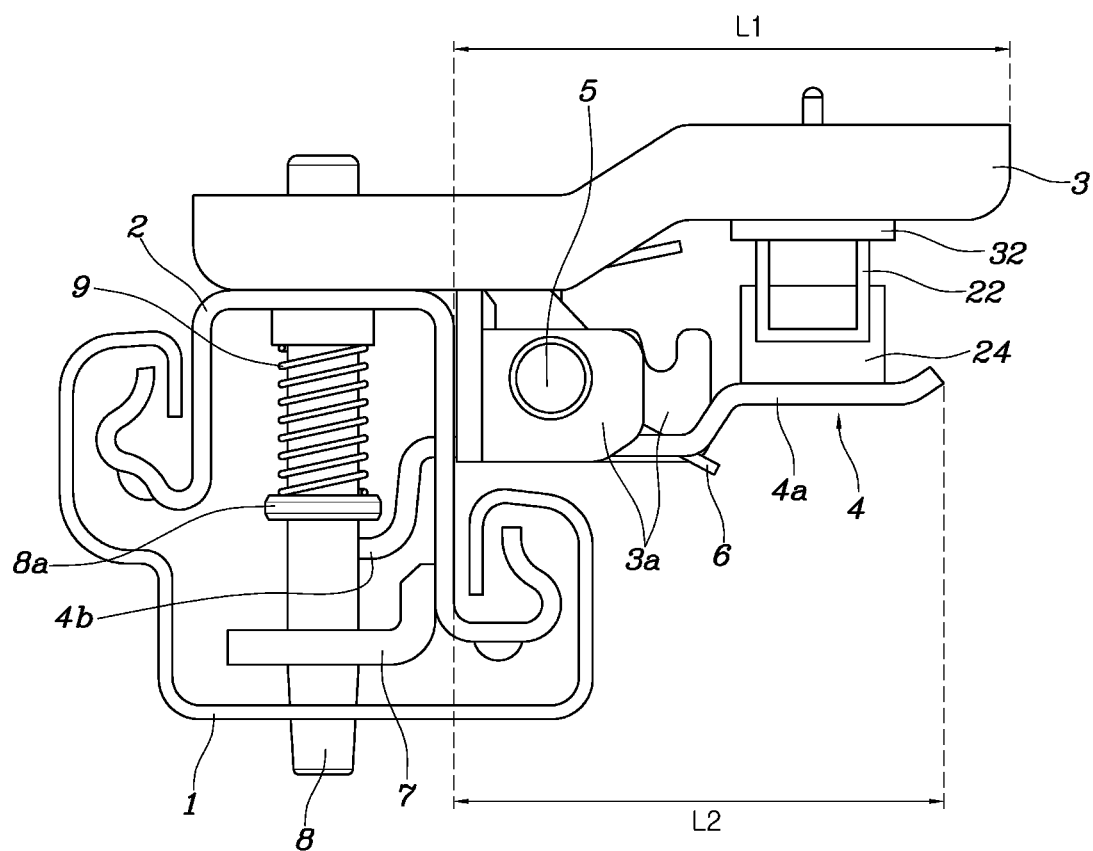
FIG. 3 is a front view of the seat rail according to the present disclosure.
Figure 4:
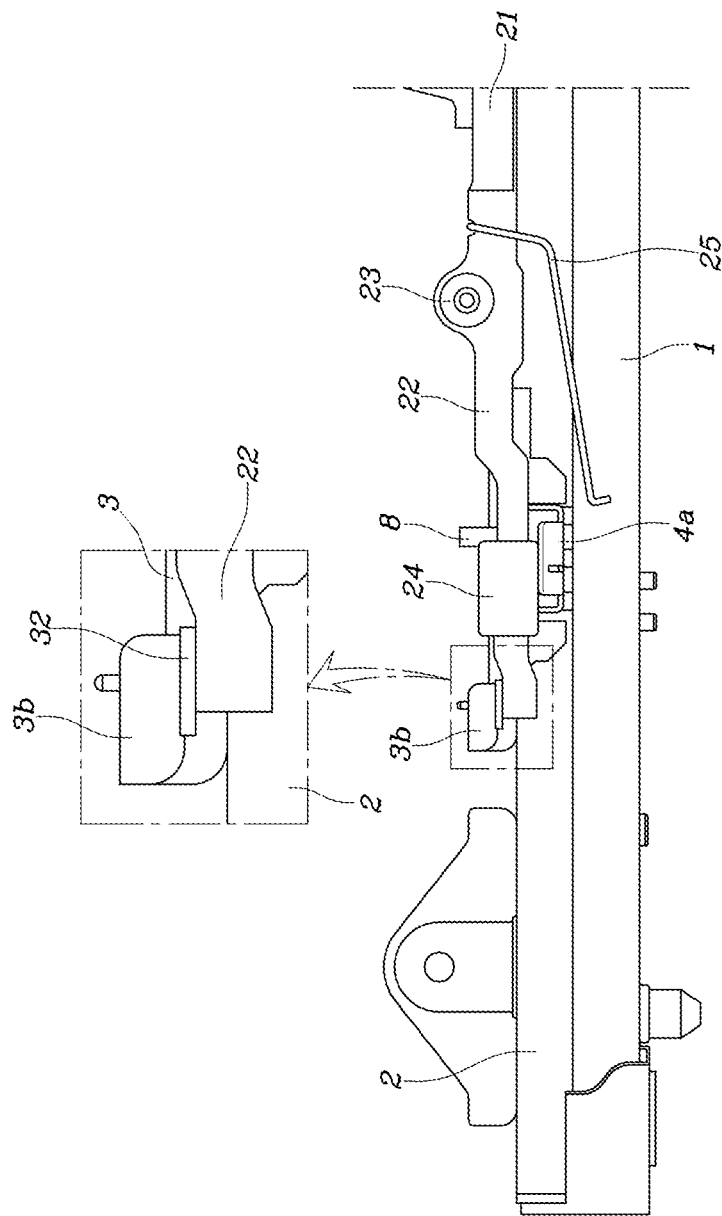
FIG. 4 is a side view of the seat rail according to the present disclosure.

As shown in FIGS. 1 to 4, the seat rail for a vehicle according to the present disclosure includes a fixed rail 1 extending in forward/rearward directions of the vehicle and being fixed to a floor panel in the vehicle, a moving rail 2 combined with the fixed rail 1 so as to slide along a longitudinal direction of the fixed rail 1, and a locking apparatus restricting sliding of the moving rail 2 in the forward/rearward directions.

As shown in the drawings, as a manual type, the locking apparatus having a release lever and a locking pin includes a locking mounting bracket 3, the release lever 4, a lever shaft 5, a lever spring 6, a guide bracket 7, multiple locking pins 8, and one locking pin spring 9 provided per each of the locking pins 8.

The locking mounting bracket 3 is combined on an upper surface of the moving rail 2 so as to be fixed thereto and includes opposing bracket flanges 3a provided thereon when the locking mounting bracket 3 is combined on the moving rail 2, each of the bracket flanges protruding from an outer side of the moving rail 2 in a side direction thereof and being spaced apart from each other in the forward/rearward directions.

The release lever 4 is positioned between the bracket flanges 3a, wherein the lever shaft 5 integrally passes through the opposing bracket flanges 3a and the release lever 4 in the forward/rearward directions and is combined therewith, and the lever spring 6 is wound on the lever shaft 5, a first end of the lever spring 6 being supported by the locking mounting bracket 3 and a second end thereof being supported by the release lever 4. When the release lever 4 rotates relative to the lever shaft 5, the release lever 4 may be elastically rotated by an elastic force of the lever spring 6.

The release lever 4 includes a manipulation part 4a and an operation part 4b contacting with the locking pin 8. The manipulation part 4a protruding to an outer side of the seat rail relative to the lever shaft 5 is manipulated by a worker. The operation part 4b passes through the moving rail 2, and an end portion of the operation part 4b is positioned in the moving rail 2, and contacts with the locking pin 8 so as to move the locking pin 8 during the manipulation of the manipulation part 4a.

When a user presses down the manipulation part 4a of the release lever 4, the lever spring 6 is compressed, an operation part 4b of the release lever 4 lifts up, and the locking pin 8 is lifted up by operation in cooperation with the release lever 4 lifted up. In this case, as a lower end of the locking pin 8 is released from a pin hole of the fixed rail 1, the seat rail is unlocked such that the moving rail 2 may move.

On the contrary, when the manipulation part 4a, which is pressed down, of the release lever 4 is released, the release lever 4 is restored to an initial position thereof by a restoring force of the lever spring 6. In this case, as the locking pin 8 is lowered and the lower end of the locking pin 8 is inserted into the pin hole of the fixed rail 1, the seat rail is locked such that the moving rail 2 may not move.

The guide bracket 7 is an L-shaped bracket, a first end thereof being combined with an inner side surface of one side wall of the moving rail 2 so as to be fixed thereto and a second thereof being provided so as to pass through an inner space of the moving rail 2 in leftward/rightward directions of the seat rail.

The multiple locking pins 8 are arranged in a row in the forward/rearward directions, and each of the locking pins 8 is provided to integrally pass through the fixed rail 1, the guide bracket 7, the moving rail 2, and the locking mounting bracket 3 in a vertical direction and to move vertically. Opposite ends of the locking pin spring 9 are provided to be supported by the retainer 10 and a locking pin flange 8a.

The retainer 10 is provided on an inner side of the upper surface of the moving rail 2, and the locking pin flange 8a is provided to be integral to the locking pin 8.

During operation of the release lever 4, the operation part 4b of the release lever 4 lifts up the locking pin 8 by contacting with the locking pin flange 8a of the locking pin 8.

Meanwhile, according to the present disclosure, by using one commonly-used part, the seat rail for a vehicle having a towel bar inhibits a misoperation of the locking apparatus due to the feet of a rear seat passenger by inhibiting interference of the passengers feet with the locking apparatus and inhibits deformation of the towel bar when the towel bar is pressed down.

That is, a towel bar assembly 20 for operating the release lever 4 includes the towel bar 21, which is roughly U-shaped, a towel bar lever 22 combined with the towel bar 21, a hinge shaft 23, and a lever bracket 24.

A middle portion of the towel bar 21 is arranged in the forward direction and opposite end portions of the towel bar 21 are arranged on inner sides of seat rail in longitudinal directions of the seat rail.

Each of the opposite end portions of the towel bar 21 is combined with a front end portion of the towel bar lever 22, the hinge shaft 23 is combined on a middle portion of the towel bar lever 22, the hinge shaft 23 is combined with a lever mounting bracket 31 so as to be fixed thereto, and a rear end portion of the towel bar lever 22 contacts with the release lever 4 and is mounted to the locking mounting bracket 3 to be supported thereby.

The lever mounting bracket 31 is spaced apart from the locking mounting bracket 3 in the forward direction and is combined on the upper surface of the moving rail 2 to be fixed thereto.

The towel bar lever 22 is configured to be elastically rotated by a towel bar spring 25. That is, when a passenger lifts up the towel bar 21 by holding the middle portion thereof, a front side of the towel bar lever 22 combined with each of opposite ends of the towel bar 21 is rotated to lift up and a rear side thereof is rotated to be lowered relative to the hinge shaft 23. In this case, the towel bar spring 25 is compressed and has an elastic force accumulated therein.

When the towel bar 21 lifts up, the towel bar lever 22 positioned on a rear side of the hinge shaft 23 relative to the hinge shaft 23 is lowered and presses down the manipulation part 4a of the release lever 4. Accordingly, as the locking pin 8 is lifted up by the operation of the release lever 4, the seat rail is unlocked such that the moving rail 2 may move.

When the towel bar 21 lifts up, the lever bracket 24 combined with the towel bar lever 22 presses down the manipulation part 4a while contacting with the manipulation part 4a of the release lever 4. Since the lever bracket 24 functions to increase a contact area of towel bar lever 22 with the manipulation part 4a, the lever bracket 24 serves to operate the release lever 4 more stably.

Since the towel bar lever 22 is configured to be integral to the lever bracket 24, the towel bar lever 22 is configured to include the lever bracket 24 according to the present disclosure.

When a passenger lifts up the towel bar 21 by holding the middle portion thereof, a front side of the towel bar lever 22 combined with each of the opposite ends of the towel bar 21 is rotated to lift up and a rear side thereof is rotated to be lowered relative to the hinge shaft 23. In this case, the towel bar spring 25 is compressed and has the elastic force accumulated therein.

Furthermore, when the towel bar 21 lifted up is released, the towel bar 21 is restored to an initial position thereof by a restoring force of the towel bar spring 25 and the release lever 4 is restored to the initial position thereof by the restoring force of the lever spring 6, and the locking pin 8 lifted up is lowered and the fixed rail 1 is fixed, and accordingly, the seat rail is locked such that the moving rail 2 cannot move.

Accordingly, the seat rail having the towel bar 21 is normally provided at a first row at which the driver seat and a seat of the front passenger seat are positioned. Accordingly, according to the present disclosure, inhibiting a misoperation of the release lever 4 and a rotation of the towel bar 21 in a downward direction of the vehicle due to interference of the feet of a rear seat passenger is realized by the locking mounting bracket 3.

In the structure of the seat rail having the towel bar, when a rear seat passenger (a second-row seat passenger) stretches his or her feet to a space under the first-row seat, the locking apparatus may the misoperation due to the feet of the rear seat passenger. Accordingly, the seat rail having the towel bar 21 has a structure so as to inhibit the misoperation of the locking apparatus due to the feet of a rear seat passenger.

In addition, the seat rail having the towel bar 21 involves a structure that inhibits bending of the towel bar 21 so as to inhibit misoperation of the towel bar due to a user unconsciously pressing down the towel bar 21.

However, a conventional seat rail normally has separate structures to inhibit misoperation of the locking apparatus due to the feet of a rear seat passenger and to inhibit deformation of the towel bar, thereby increasing the number of parts, manufacturing cost, and weight. However, according to the present disclosure, a structure of inhibiting misoperation of the locking apparatus due to interference of the feet of a rear seat passenger and deformation of the towel bar 21 is realized by the locking mounting bracket 3.

To this end, the locking mounting bracket 3 includes a stopper part 3b positioned behind the bracket flanges 3a relative to the bracket flanges 3a with which the release lever 4 is combined. When the locking mounting bracket 3 is combined with the moving rail 2 so as to be fixed thereto, the stopper part 3b is configured to protrude in the side direction of the moving rail 2 which is the same direction as a protruding direction of each of the bracket flanges 3a.

Accordingly, the rear end portion of the towel bar lever 22 contacts with an upper surface of the manipulation part 4a of the release lever 4 and is supported by a lower surface of the stopper part 3b.

According to the present disclosure, the stopper part 3b of the locking mounting bracket 3 inhibits the feet of a rear seat passenger from interfering with the release lever 4 and a rotation of the towel bar 21 in a downward direction via contact with the towel bar lever 22.

That is, the conventional seat rail normally has separate structures to inhibit interference of the feet of a rear seat passenger and to inhibit the rotation of the towel bar in the downward direction, thereby increasing the number of parts, manufacturing cost, and weight. However, according to the present disclosure, the stopper part 3b of the locking mounting bracket 3 is configured to realize the two functions, which decreases the number of parts, manufacturing cost, and weight.

The stopper part 3b of the locking mounting bracket 3 includes a pad member 32 combined therebeneath so as to inhibit noise, and the rear end portion of the towel bar lever 22 contacts with the pad member so as to be supported thereby.

The pad member 32 may be made of a rubber or silicon and any other material that can absorb impact and noise may be used as a pad member.

A protruding length L1 of the stopper part 3b protruding in the side direction of the moving rail 2 is configured to be longer than a protruding length L2 of the manipulation part 4a of the release lever 4 such that interference of the feet of a rear seat passenger can be blocked by the stopper part 3b of the locking mounting bracket 3.

That is, since the stopper part 3b of the locking mounting bracket 3 is positioned at a side rearer than the manipulation part 4a of the release lever 4, and the protruding length L1 of the stopper part 3b is configured to be longer than the protruding length L2 of the manipulation part 4a, when seen from a rear of the seat rail, the manipulation part 4a of the release lever 4 is covered by the stopper part 3b of the locking mounting bracket 3.

Accordingly, though a rear seat passenger stretches their feet to the space under the first-row seat having the towel bar 21, the feet of the rear seat passenger are stopped by the stopper part 3b of the locking mounting bracket 3 and are inhibited from interfering with the release lever 4. Accordingly, in the structure of the seat rail having the towel bar 21, the release lever 4 can be inhibited from being brought into misoperation due to the feet of the rear seat passenger.

When the protruding length L2 of the manipulation part 4a of the release lever 4 is configured to be longer than the protruding length L1 of the stopper part 3b, the release lever 4 may be brought into misoperation due to the feet of a rear seat passenger, and so the above-mentioned structure is not desirable.

As described above, according to the present disclosure, the stopper part 3b is provided on the locking mounting bracket 3 with which the release lever 4 is combined, the stopper part protruding longer than the protruding length of the release lever 4 in the same direction as the protruding direction of the release lever 4. Accordingly, the stopper part 3b of the locking mounting bracket 3 is used to inhibit feet of a rear seat passenger from interfering with the release lever 4 and the stopper part 3b can inhibit the rotation of the towel bar 21 in the downward direction via contact with the towel bar lever 22.

Accordingly, by using the stopper part 3b of the locking mounting bracket 3, which is the one commonly-used part, the seat rail for a vehicle having the towel bar 21 inhibits misoperation of the release lever 4 due to the feet of a rear seat passenger by inhibiting interference of the passengers feet with the release lever 4 and inhibits deformation of the towel bar 21 when the towel bar 21 is pressed down, thereby decreasing of the number of parts, manufacturing cost, and weight, and further making an entire external size of the seat rail compact.

Although one form of the seat rail of the present disclosure has been described for illustrative purposes, those skilled in the art will appreciate that various modifications, additions and substitutions are possible, without departing from the scope and spirit of the present disclosure as disclosed in the accompanying claims.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, manufacturing technology, and testing capability.

As used herein, the phrase at least one of A, B, and C should be construed to mean a logical (A OR B OR C), using a non-exclusive logical OR, and should not be construed to mean "at least one of A, at least one of B, and at least one of C.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A seat rail for a vehicle, the seat rail comprising:
    a locking mounting bracket being combined on a moving rail so as to be fixed thereto and having a release lever rotatably combined therewith, the release lever forming a locking apparatus;
    a lever mounting bracket being spaced apart from the locking mounting bracket in a forward direction of the vehicle and being combined on the moving rail so as to be fixed thereto; and
    a towel bar lever being rotatably combined with the lever mounting bracket, the towel bar lever having a towel bar combined with a first end thereof, and a second end of the towel bar lever contacting the release lever, the towel bar lever being supported by the locking mounting bracket,
    wherein the locking mounting bracket includes bracket flanges and the release lever is positioned between the bracket flanges, and a stopper part is positioned behind the bracket flanges, each of the bracket flanges and the stopper part protruding in a side direction of the moving rail,
    wherein a rear end portion of the towel bar lever contacts an upper surface of a manipulation part of the release lever and is supported by a lower surface of the stopper part.

2. The seat rail of claim 1, wherein the locking mounting bracket inhibits misoperation of the release lever and a rotation of the towel bar in a downward direction of the vehicle.

3. The seat rail of claim 1, wherein the stopper part of the locking mounting bracket inhibits feet of a rear seat passenger from interfering with the release lever and a rotation of the towel bar in a downward direction via contact with the towel bar lever.

4. The seat rail of claim 1, wherein the stopper part includes a pad member, and the rear end portion of the towel bar lever contacts with the pad member so as to be supported thereby.

5. The seat rail of claim 1, wherein a protruding length of the stopper part protruding in the side direction of the moving rail is configured to be longer than a protruding length of the manipulation part of the release lever such that interference of feet of a rear seat passenger can be stopped by the stopper part.

* * * * *